United States Patent
Rieth et al.

(10) Patent No.: US 7,321,311 B2
(45) Date of Patent: Jan. 22, 2008

(54) STEERING HANDLE FOR MOTOR VEHICLES AND METHOD FOR RECORDING A PHYSICAL PARAMETER ON A STEERING HANDLE

(75) Inventors: Peter Rieth, Eltville (DE); Jürgen Böhm, Oberneisen (DE); Steffen Linkenbach, Eschborn (DE); Oliver Hoffmann, Frankfurt (DE); Joachim Nell, Hanau (DE); Andreas Schirling, Pfungstadt (DE); Achim Netz, Seeheim-Jugenheim (DE); Peter Stauder, Mainz (DE); Matthias Kuhn, Mainaschaff (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 166 days.

(21) Appl. No.: 10/526,717

(22) PCT Filed: Sep. 4, 2003

(86) PCT No.: PCT/EP03/09802

§ 371 (c)(1),
(2), (4) Date: Mar. 4, 2005

(87) PCT Pub. No.: WO2004/022409

PCT Pub. Date: Mar. 18, 2004

(65) Prior Publication Data

US 2005/0242965 A1    Nov. 3, 2005

(30) Foreign Application Priority Data

Sep. 6, 2002   (DE) ............... 102 41 414
Dec. 13, 2002  (DE) ............... 102 58 648
Jan. 10, 2003  (DE) ............... 103 00 874

(51) Int. Cl.
*G08B 23/00*   (2006.01)
*G01R 27/26*   (2006.01)
*G05D 1/00*    (2006.01)
*B60K 28/00*   (2006.01)

(52) U.S. Cl. .................. 340/576; 340/573.1; 340/575; 340/576; 324/658; 324/660; 324/686; 701/1; 701/41; 180/271; 180/272

(58) Field of Classification Search ........ 340/575–576, 340/573.1; 180/271–272, 280; 701/1, 41; 324/658, 660, 686

See application file for complete search history.

(56) References Cited

U.S. PATENT DOCUMENTS

| | | | | |
|---|---|---|---|---|
| 3,703,217 A | * | 11/1972 | Kulick et al. | 180/272 |
| 5,396,215 A | * | 3/1995  | Hinkle       | 340/426.17 |
| 5,453,929 A | * | 9/1995  | Stove        | 701/1 |
| 5,585,785 A | * | 12/1996 | Gwin et al.  | 340/575 |
| 5,874,892 A | * | 2/1999  | Antonellis et al. | 340/438 |
| 6,218,947 B1 | * | 4/2001 | Sutherland    | 340/576 |
| 6,366,207 B1 | * | 4/2002 | Murphy        | 340/576 |
| 6,370,460 B1 | * | 4/2002 | Kaufmann et al. | 701/41 |

(Continued)

FOREIGN PATENT DOCUMENTS

DE    1 950 361    4/1971

(Continued)

*Primary Examiner*—Benjamin C. Lee
*Assistant Examiner*—Lam Pham
(74) *Attorney, Agent, or Firm*—RatnerPrestia

(57) ABSTRACT

Steering handle, in particular steering wheel, for motor vehicles, on which means are provided for recognition of a contact between at least one hand of the vehicle driver and the steering handle (free hand recognition).

6 Claims, 3 Drawing Sheets

U.S. PATENT DOCUMENTS

| | | | |
|---|---|---|---|
| 6,426,635 B1 * | 7/2002 | Nussbaum | 324/686 |
| 6,501,281 B1 * | 12/2002 | Rundo | 324/658 |
| 6,590,499 B1 * | 7/2003 | D'Agosto | 340/575 |
| 6,859,143 B2 * | 2/2005 | Braeuchle et al. | 340/576 |
| 7,019,623 B2 * | 3/2006 | Klausner et al. | 340/425.5 |

FOREIGN PATENT DOCUMENTS

| | | |
|---|---|---|
| DE | 31 10 334 A1 | 2/1982 |
| DE | 32 36 080 A1 | 4/1983 |
| DE | 34 43 644 A1 | 6/1985 |
| DE | 195 45 848 A1 | 6/1997 |
| DE | 198 01 009 C1 | 4/1999 |
| DE | 199 20 450 A1 | 12/1999 |
| DE | 199 52 217 A1 | 5/2001 |
| DE | 100 48 956 C1 | 5/2002 |
| DE | 101 21 693 A1 | 11/2002 |
| EP | 0 545 497 A1 | 9/1993 |
| EP | 1 074 454 A1 | 2/2001 |
| FR | 2 507 142 | 12/1982 |
| JP | 2000182464 | 6/2000 |
| WO | WO 98/05543 | 2/1998 |
| WO | WO 01/94188 A1 | 12/2001 |
| WO | WO 02/066287 A1 | 8/2002 |

\* cited by examiner

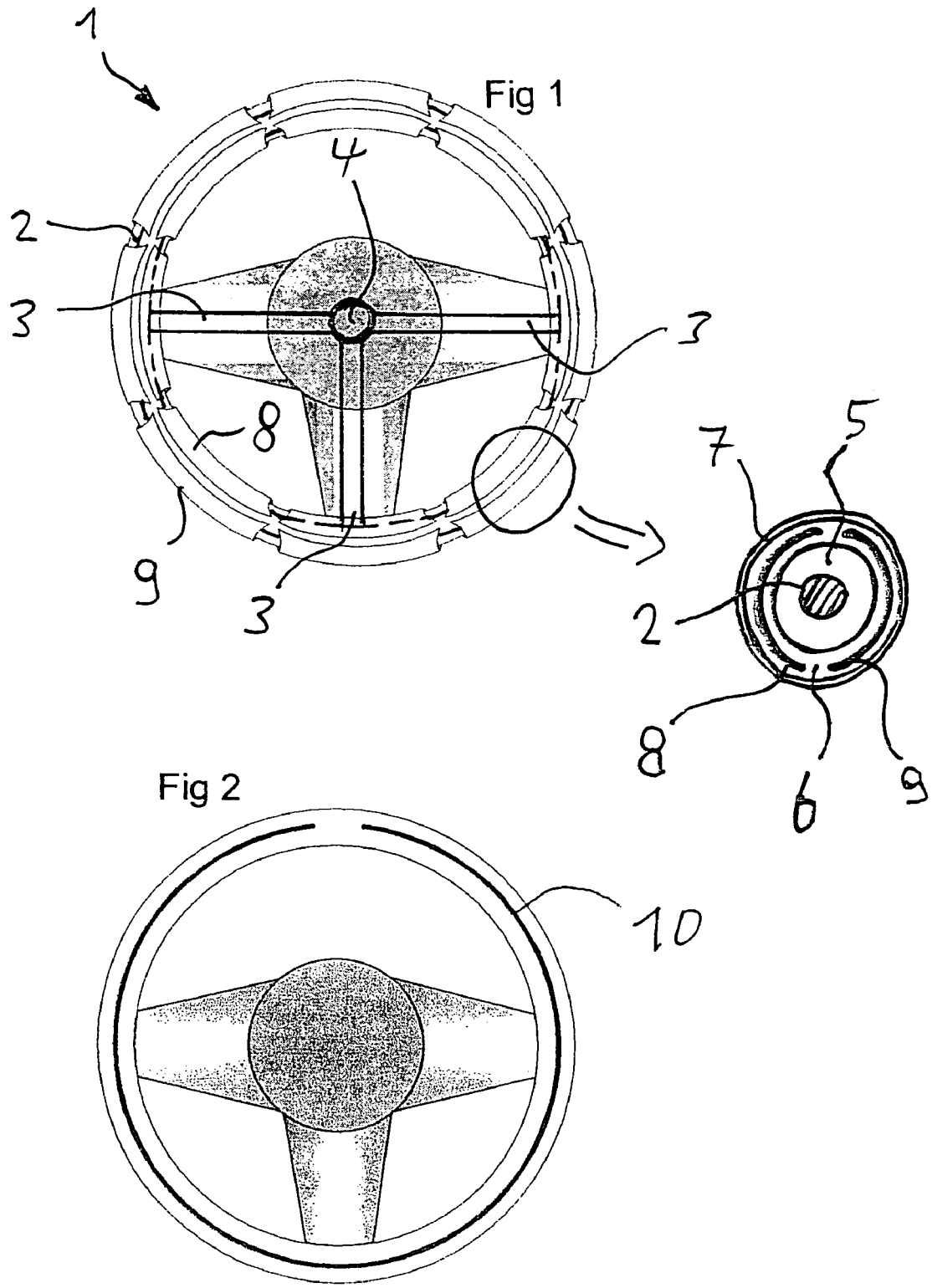

STEERING HANDLE FOR MOTOR VEHICLES AND METHOD FOR RECORDING A PHYSICAL PARAMETER ON A STEERING HANDLE

TECHNICAL FIELD

The present invention relates to a steering handle, in particular a steering wheel, for motor vehicles.

The invention also relates to a method for recording a physical parameter on a steering handle.

The invention relates as well to a steer-by-wire steering system for a motor vehicle and a steering system for a motor vehicle in which a steering torque is actively applied (IPAS).

BACKGROUND OF THE INVENTION

In case of a steering handle which is mechanically uncoupled from the steering actuator and electronically transmits a steering signal to a steering actuator (steer-by-wire steering system) or for an IPAS system (Intelligent Power Assisted Steering) in which the steering wheel torque is actively influenced, it is necessary to determine whether or not the driver has at least one hand on the steering handle or whether the driver holds the steering handle tightly or whether he steers only with one finger.

In certain driving situations the driver has to counteract a torque at the steering handle. In this case it has to be determined whether the driver holds the steering handle tightly.

BRIEF SUMMARY OF THE INVENTION

It is the object of the invention to disclose a steering handle, in particular a steering wheel, and a method suitable for a steer-by-wire steering system.

This object is achieved according to the present invention by the characteristics of the independent patent claims. Favorable developments are described by the characteristics of the dependent claims.

According to the present invention, the object is achieved in that means are provided for detecting a contact between at least one hand of the driver and the steering handle (free hand recognition). In the following the term "free hand recognition" is therefore defined as the recognition of a contact between or a touch of at least one hand of the vehicle operator (driver) and the steering handle.

According to the invention, the means for the free hand recognition are arranged in such a way that they are applied under the outer layer (e.g. leather coat), thus being invisible for the driver.

According to the invention the free hand recognition is realized by means of one or more electrically conducting metal elements arranged in the steering handle.

The steering handle according to the invention is designed as capacitive free hand recognition.

According to the invention the steering handle is provided with at least one electrode arranged under a cover interacting with a fastening element of the steering handle and thus preferably forming a capacitor.

According to the invention, the damping that develops when the driver acts upon the steering handle, is recorded in case the steering handle is designed as capacitive free hand recognition.

According to the invention the free hand recognition is realized by means of one or more pressure-resistant piezoelectric elements arranged in the steering handle.

The free hand recognition according to the invention is realized by means of one or more strain gauges arranged on a metal strip in the steering handle.

According to the invention the piezoelectric elements are arranged in pairs around the steering handle, preferably in segments.

The free hand recognition according to the invention is realized by determining the deflection of the steering column.

According to the invention the free hand recognition is realized by means of one or more waves or oscillations of or on the steering handle.

According to the invention the waves are optical waves.

According to the invention said waves are surface waves.

The damping of the wave or waves caused when the driver acts upon the steering handle is recorded according to the invention.

The free hand recognition, according to the invention, is realized by determining the electric conductivity of the surface of the steering handle.

According to the invention the free hand recognition is realized by measuring the temperature of the surface of the steering handle.

According to the invention the steering handle is provided with a heating, and at least one metal component of the heating interacts with the free hand recognition.

A heating filament or a heating foil is used as an electrode for capacitive free hand recognition according to the present invention.

According to the invention the heating is supplied with direct voltage, the free hand recognition with a high-frequency alternating voltage, and the electrical connection of the heating is galvanically separated from the vehicle mass.

The object is also achieved by a method for recording a physical parameter on a steering handle characterized in that the change of the physical parameter, in particular its damping, is recorded which is caused by the driver acting upon the steering handle.

The steering handle or the method is favorably used in a steer-by-wire steering or an IPAS system. With said systems functions as parameter steering, controlled behavior of the steering around the center position (center feeling), lane keeping systems (lane keeping support), lane departure driver assistance by giving a haptic warning to the driver (lane departure warning) and assistance in stop-and-go operation as well as automatic parking can be realized.

BRIEF DESCRIPTION OF THE DRAWINGS

FIG. 1 schematically shows a steering handle, in particular a steering wheel, with capacitive free hand recognition.

FIG. 2 schematically shows a steering handle with piezoelectric free hand recognition.

DETAILED DESCRIPTION OF THE PREFERRED EMBODIMENTS

Figure 3:
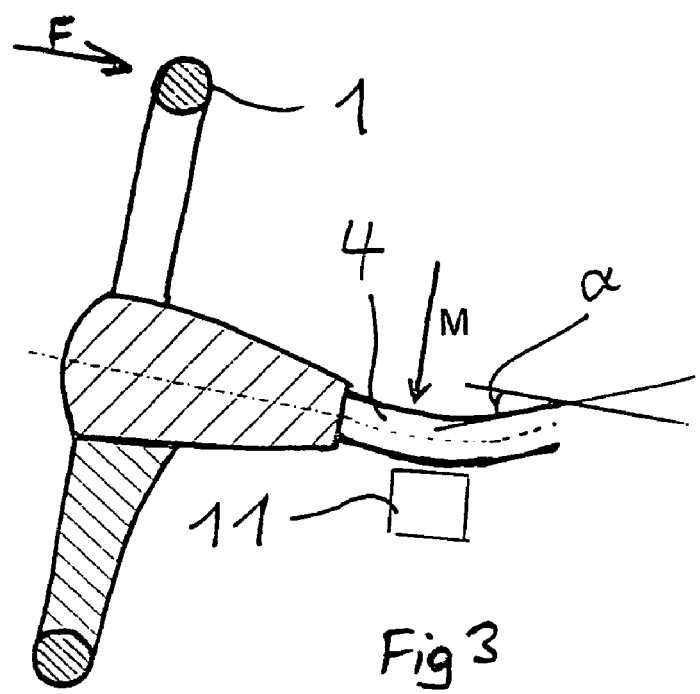
FIG. 3 schematically shows a steering handle in which the free hand recognition is realized on account of a deflection of the steering column.

FIG. 1 represents a steering wheel as steering handle in which the free hand situation is recognized in a capacitive manner.

The steering wheel 1 is provided with a core 2, normally a metal ring, being screwed on the steering column 4 with several struts 3. The core 2 is coated with a plastic material 5. Said coat is normally covered with another layer of elastic material 6, as e.g. thin foamed plastic and/or a leather coat 7.

Another metal element is arranged around the metal ring 2 of the steering wheel 1 in order to recognize a hand on the steering wheel. Said metal element can consist of either an electrically conducting metal foil or an electrically conducting metal fabric. The metal element forms a capacity together with the metal ring 2 of the steering wheel. The dielectric material forms the plastic coat 5 of the steering handle. The leather coat 7 or a plastic coat serves as isolation.

Thus, the steering wheel represents a capacitor. Said capacitor is used as capacitive transmitting element. The driver is grounded by his contact with the seat, the bottom and the pedals. The dielectric material of the capacitor is changed by the driver's hand. The transmission is damped when the driver has his hand on the steering wheel. Said damping is measured and when the result is lower than a certain damping limit value, a signal is generated for the case that the driver has no contact with the steering wheel 1.

Preferably, electrode pairs 8,9 are arranged in the foamed plastic around the core 2 of the steering handle 1 as metal elements. These are arranged as differential capacitors. Thus malfunctions and temperature influences are eliminated. The dielectric material of the differential capacitor is changed by way of the human hand so that the hand on the steering wheel is recognized.

As regards the steering wheel shown in FIG. 2, free hand recognition of a contact between driver and steering wheel is realized in a piezoelectric manner.

A pressure-resistant cable (PZT cable) 10 is inserted into the steering wheel. A small pressure exerted on the steering wheel is sensed by said cable 10.

In the embodiment shown in FIG. 3 a contact between the driver's hand and the steering wheel is recognized due to the deflection of the steering column.

When the hands are lying on the steering wheel 1, they exert a leverage F on the steering column 4. With a sensor 11 that measures the deflection, e.g. the angle a of the steering column deflection, a signal is generated when the deflection falls below a certain limit value. Then, it is deemed to have been identified that the driver's hands are no longer on the steering wheel.

Furthermore, optical free hand recognition is provided. In this case the outer coat of the steering handle is perforated. Under the coat, reflecting light barriers are arranged on the circumference of the steering handle. The hand will reflect the light emitted by these light barriers. In this case these portions of the light cannot reach a light-sensitive sensor, thus indicating that the driver has his hands on the steering wheel.

Figure 4:
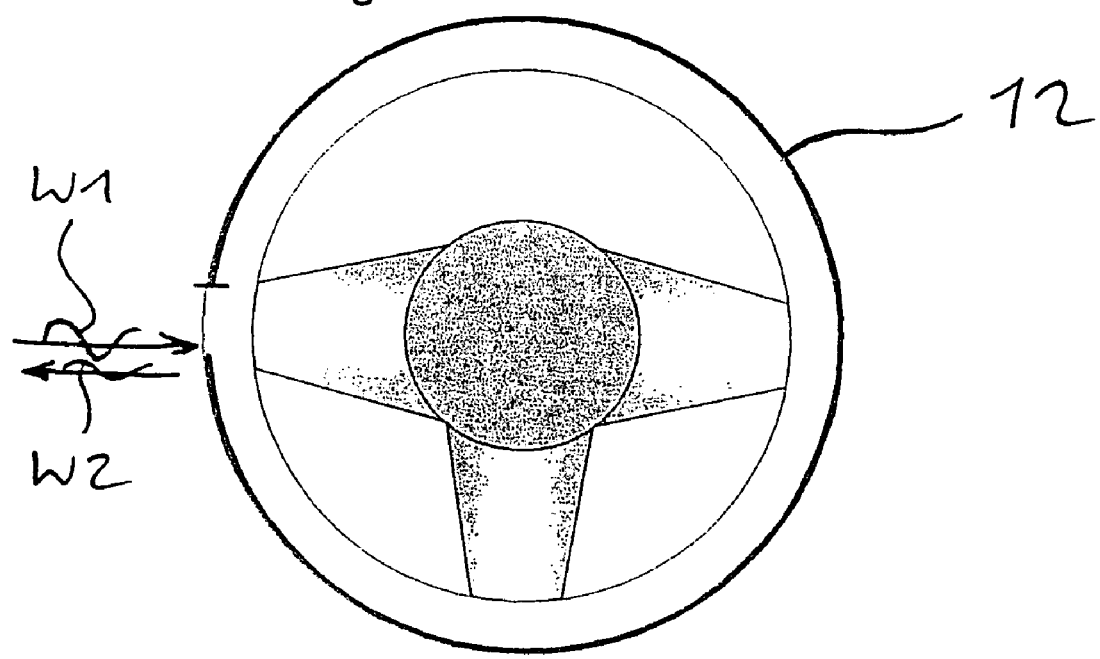
FIG. 4 schematically shows a steering handle in which the free hand recognition is realized on the basis of surface waves on the steering handle.

FIG. 4 schematically shows a steering wheel in which the free hand recognition of a contact of the driver's hand is realized on the basis of surface waves of the steering handle.

A ring segment 12 made of a hard material is arranged on the circumference of the steering handle. On one end a mechanical wave W1 is introduced which is reflected at the other end. The reflected wave W2 is measured. If the reflected wave W2 is considerably weakened or no longer present, the driver has at least one hand on the steering wheel. In addition also information on the function of the sensor is given due to the phase displacement. In case of a constant phase displacement there are no malfunctions.

According to a similar principle, the free hand recognition is based on light waves. A non-isolated glass-fiber cable is arranged around the steering wheel. The light wave is introduced and reflected at the end. The amplitude is weakened by a contact with the driver's hand.

The free hand recognition by light waves and surfaces waves is also working if it is not the reflected wave that is measured but a measurement is realized at the end of the cable or the surface wave conductor.

There is also the possibility of electrically resistant free hand recognition by means of a steering wheel. In this case the steering wheel is coated with an electrically conducting plastic material provided with isolating separating portions arranged in short intervals. Since the driver's hand has a certain electrical conductivity, two or more parts are electrically by-passed thus indicating that the driver has at least one hand on the steering wheel.

It is intended to realize the free hand recognition on the basis of a temperature measurement. To this end the steering handle is provided with temperature sensors being evenly distributed over the circumference. If the sun heats up the steering wheel in summer, the points where the hands come into contact with the wheel, are colder. With low vehicle inner temperatures, e.g. in winter, those points where the hands come into contact with the steering wheel are warmer. Thus, the contact of the driver's hand is recognized by way of measuring a temperature difference or a temperature gradient.

In another embodiment of the present invention the steering column is excited with an actuator, e.g. in a sinusoidal manner, which cannot be sensed by the driver. The hands on the steering wheel damp this excitation. Said excitation can be read out with a sensitive accelerometer.

The highest resolution and the least susceptibility to environmental influences and malfunctions and, in total, the most secure free hand recognition even if the driver's hands are gloved is possible with a capacitive measurement or by means of surface waves. Therefore these embodiments are particularly preferred.

To an increased extent, steering handles are provided with a heating. In this case the steering handle, in particular the steering wheel, is provided with a heating element consisting normally of a fabric of metallic filament threads and elastic textile threads.

Figure 5:
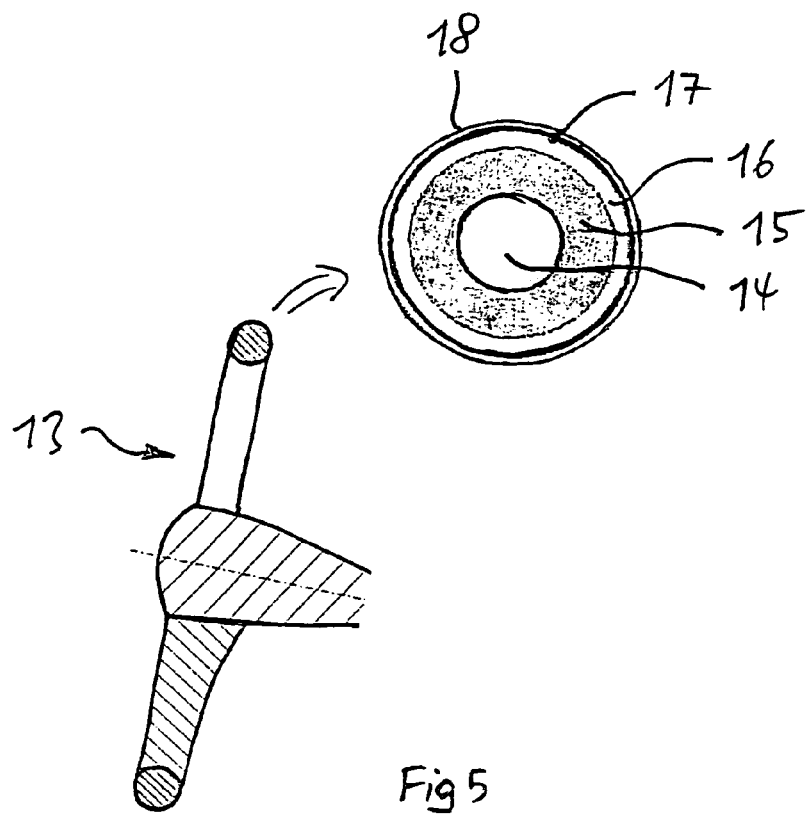
FIG. 5 schematically shows a steering handle with a heating device realizing capacitive free hand recognition.

Such a steering wheel 13 is shown in FIG. 5. Around the core 14 and a plastic coat 15, e.g. made of high-resistance foam, a heating fabric 17 is arranged in a foam plastic coat 16. As external cover a leather coat 18 is provided over this.

With this embodiment a capacitive free hand recognition is realized according to the present invention in which the fabric 17 of the steering wheel heating is also used for the function of the free hand recognition. According to the invention, the metallic heating filament 17 of the steering handle form an electrode and the steering wheel core 14 forms a counter electrode. In this case two embodiments are provided:

In a first embodiment some threads or a foil are/is inserted in the fabric 17 which are not required for heating. The fabric is then incorporated in the steering handle, in particular the steering wheel. One portion of the threads is used for heating, the additionally incorporated threads or the additional foil being used for the free hand recognition.

In another embodiment the same metallic filaments are used for heating and free hand recognition. While the heating is powered with direct voltage, the free hand recognition is realized by means of high-frequency alternating voltage pulses. In this case the heating mass is galvanically separated from the vehicle mass.

Figure 6:
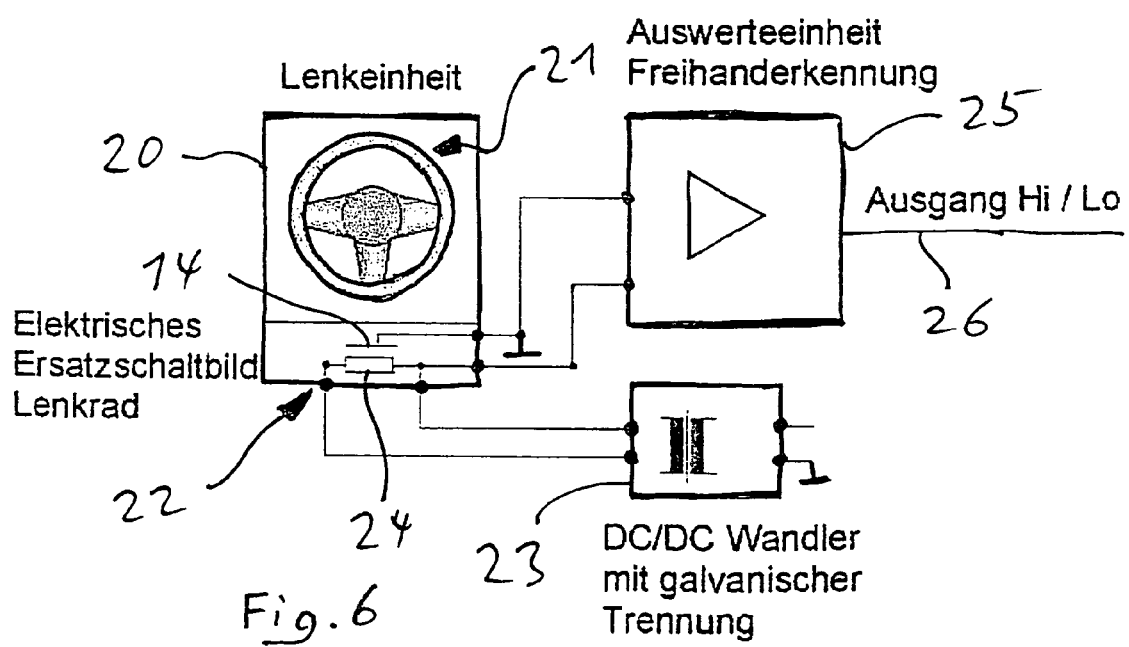
FIG. 6 schematically shows a wiring diagram for a steering handle with heating device and capacitive free hand recognition.

The electronic configuration is represented in FIG. 6. The steering unit 20 is provided with a steering wheel 21 with a heating 22. The heating 22 is provided with voltage by means of a direct voltage transformer (DC/DC converter) 23 with galvanic separation. The capacitive free hand recognition is based on a change of the electric capacity between the threads or foil of the heating 24 as well as the metal core 14 of the steering wheel 21. This change is recorded and evaluated by the evaluation unit 25. An output signal is generated which indicates whether or not the driver has at least one hand on the steering wheel 21.

The invention claimed is:

1. Steering handle for motor vehicles comprising:
    a core;
    a secondary metal about the core;
    a dielectric material between said core and said secondary metal such that a capacitor is defined thereby;
    means for monitoring a capacitance of the capacitor and determining a contact between at least one hand of the driver and the steering handle based on the monitored capacitance; and
    a second secondary metal about the core and configured such that the secondary metal and the second secondary metal define a differential capacitor.

2. Steering handle for motor vehicles according to claim 1,
    wherein the steering handle is provided with a capacitive free hand recognition.

3. Steering handle for motor vehicles according to claim 1,
    wherein damping of the monitored capacitance is identified when the driver acts upon the steering handle.

4. Steering handle for motor vehicles according to claim 1,
    wherein the change of capacitance, in particular its damping, is recorded which is caused by the driver acting upon the steering handle.

5. Steer-by-wire steering system for a motor vehicle,
    wherein it is provided with a steering handle according to claim 1.

6. Steering system for a motor vehicle on which a steering torque is actively applied (IPAS), wherein it is provided with a steering handle according to claim 1.

* * * * *